(12) United States Patent
Jang et al.

(10) Patent No.: US 10,340,759 B2
(45) Date of Patent: Jul. 2, 2019

(54) CEILING FAN MOTOR

(71) Applicant: NEW MOTECH CO., LTD., Gwangju (KR)

(72) Inventors: Jeong Cheol Jang, Gwangju (KR); Je Hyung Seo, Gwangju (KR); Hee Sang Kim, Gwangju (KR)

(73) Assignee: NEW MOTECH CO., LTD., Gwangju (KR)

(*) Notice: Subject to any disclaimer, the term of this patent is extended or adjusted under 35 U.S.C. 154(b) by 218 days.

(21) Appl. No.: 15/517,967

(22) PCT Filed: Sep. 2, 2015

(86) PCT No.: PCT/KR2015/009253
§ 371 (c)(1),
(2) Date: Apr. 10, 2017

(87) PCT Pub. No.: WO2016/098996
PCT Pub. Date: Jun. 23, 2016

(65) Prior Publication Data
US 2017/0310174 A1    Oct. 26, 2017

(30) Foreign Application Priority Data
Dec. 15, 2014    (KR) .................. 10-2014-0180032

(51) Int. Cl.
*H02K 1/27*    (2006.01)
*H02K 1/28*    (2006.01)
(Continued)

(52) U.S. Cl.
CPC .............. *H02K 1/2786* (2013.01); *H02K 1/28* (2013.01); *H02K 5/15* (2013.01); *H02K 21/22* (2013.01)

(58) Field of Classification Search
CPC .......... H02K 1/27; H02K 1/2786; H02K 1/28; H02K 21/22; H02K 21/12; H02K 5/15; H02K 21/222; F04D 25/088; F04D 25/08
(Continued)

(56) References Cited

U.S. PATENT DOCUMENTS

| 4,073,598 A | 2/1978 | Mizutani et al. |
| 8,981,610 B2 * | 3/2015 | Iversen ................ H02K 1/2786 |
| | | 310/156.12 |

(Continued)

FOREIGN PATENT DOCUMENTS

| JP | 55056476 U | * | 4/1980 |
| JP | 59-078877 U | | 5/1984 |

(Continued)

OTHER PUBLICATIONS

JP-55056476-U (English Translation) (Year: 1980).*
International Search Report for PCT/KR2015/009253 dated Dec. 9, 2015 from Korean Intellectual Property Office.

*Primary Examiner* — Julio C. Gonzalez
*Assistant Examiner* — Alexander Moraza
(74) *Attorney, Agent, or Firm* — Revolution IP, PLLC

(57) ABSTRACT

The ceiling fan motor according to the present invention includes a rotor assembly including a rotor housing installed with a plurality of yoke pieces and a plurality of magnets in the inner side, the rotor housing having a plurality of magnet fixing parts formed between the plurality of magnets, a stator assembly placed in the inner side of the rotor assembly, the stator assembly including a stator core, and an upper insulator and a lower insulator engaged with the upper part and lower part of the stator core, and a shaft fixed being engaged with the center part of the stator core, and the magnet is engaged being forcibly press-fitted between the fixing parts.

5 Claims, 5 Drawing Sheets

(51) Int. Cl.
*H02K 21/22* (2006.01)
*H02K 5/15* (2006.01)

(58) Field of Classification Search
USPC ............ 310/156.12, 156.13, 156.23, 156.28,
310/156.29, 156.31, 156.75–77, 156.08,
310/156.16, 156.17, 156.19, 156.22,
310/156.24, 156.26
See application file for complete search history.

(56) References Cited

U.S. PATENT DOCUMENTS

| | | | |
|---|---|---|---|
| 2007/0163306 A1* | 7/2007 | Kim | ................... D06F 37/304 |
| | | | 68/140 |
| 2008/0012439 A1 | 1/2008 | Wu et al. | |
| 2008/0203837 A1 | 8/2008 | Tang | |
| 2010/0040494 A1 | 2/2010 | Yamamoto et al. | |
| 2014/0348649 A1* | 11/2014 | Oleson | ................ F04D 25/088 |
| | | | 415/208.1 |

FOREIGN PATENT DOCUMENTS

| | | | |
|---|---|---|---|
| JP | 2008-128027 A | 6/2008 | |
| KR | 10-1999-0032070 A | 5/1999 | |

\* cited by examiner

[Fig. 1]
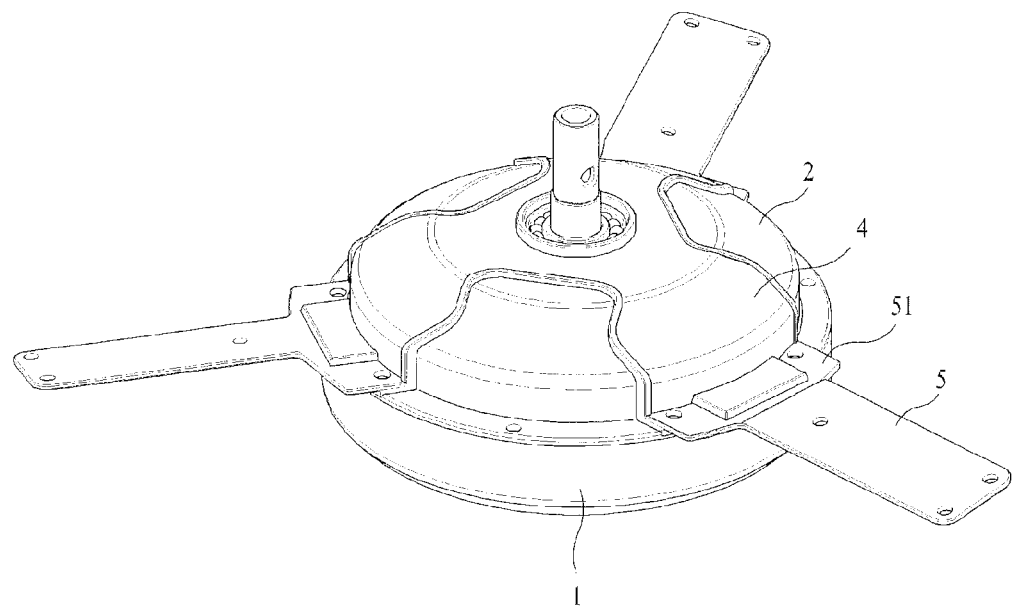
[Fig. 2]
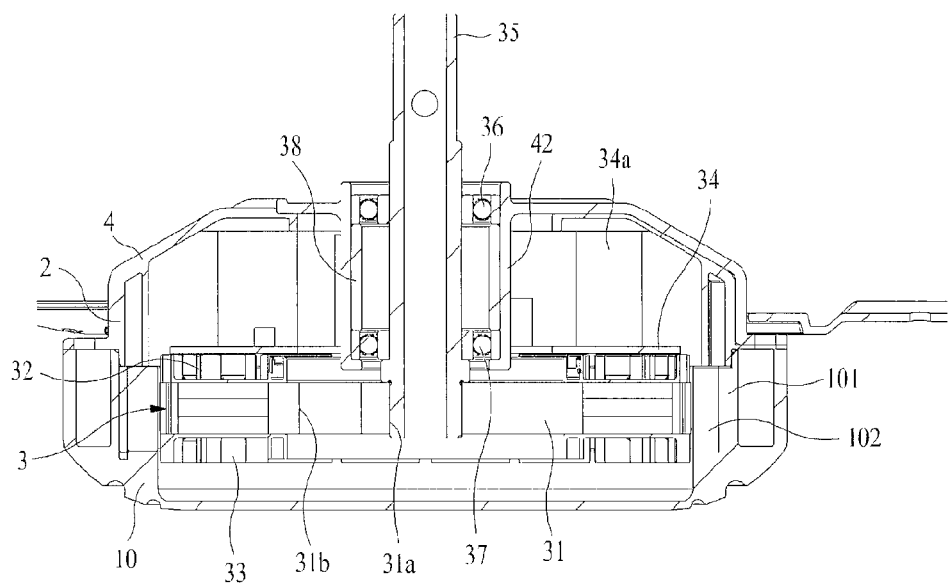

[Fig. 3]
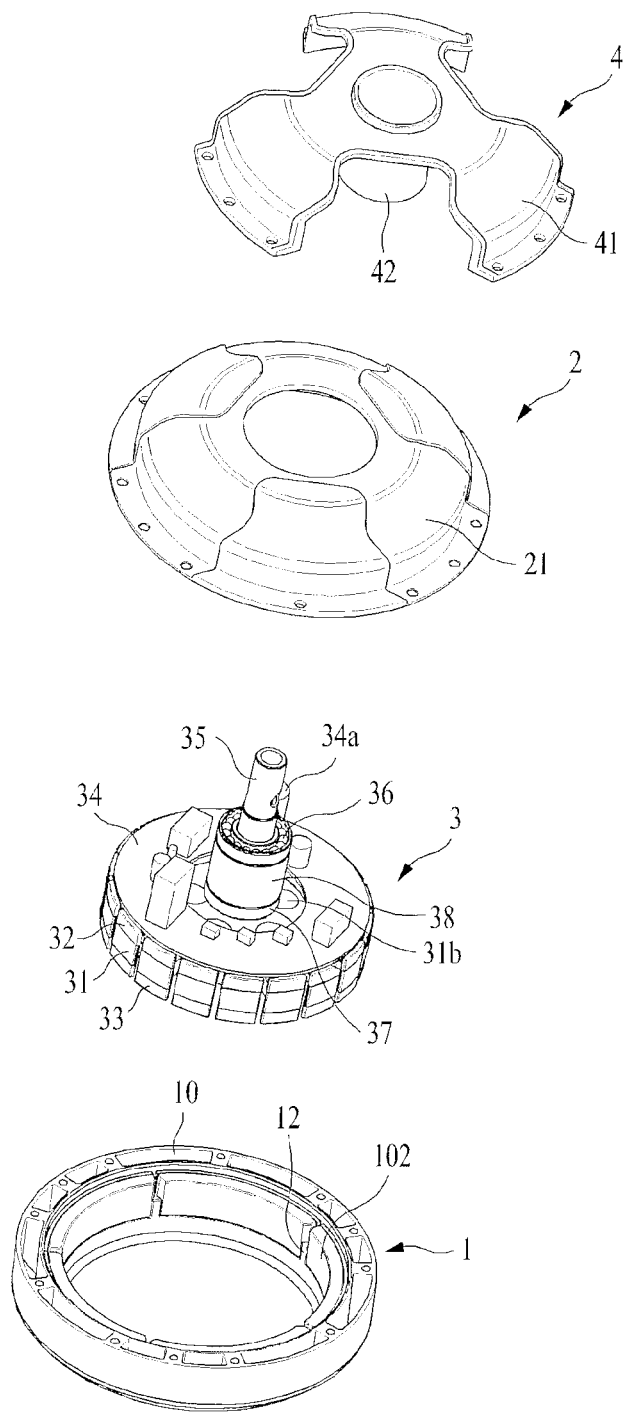

[Fig. 4]
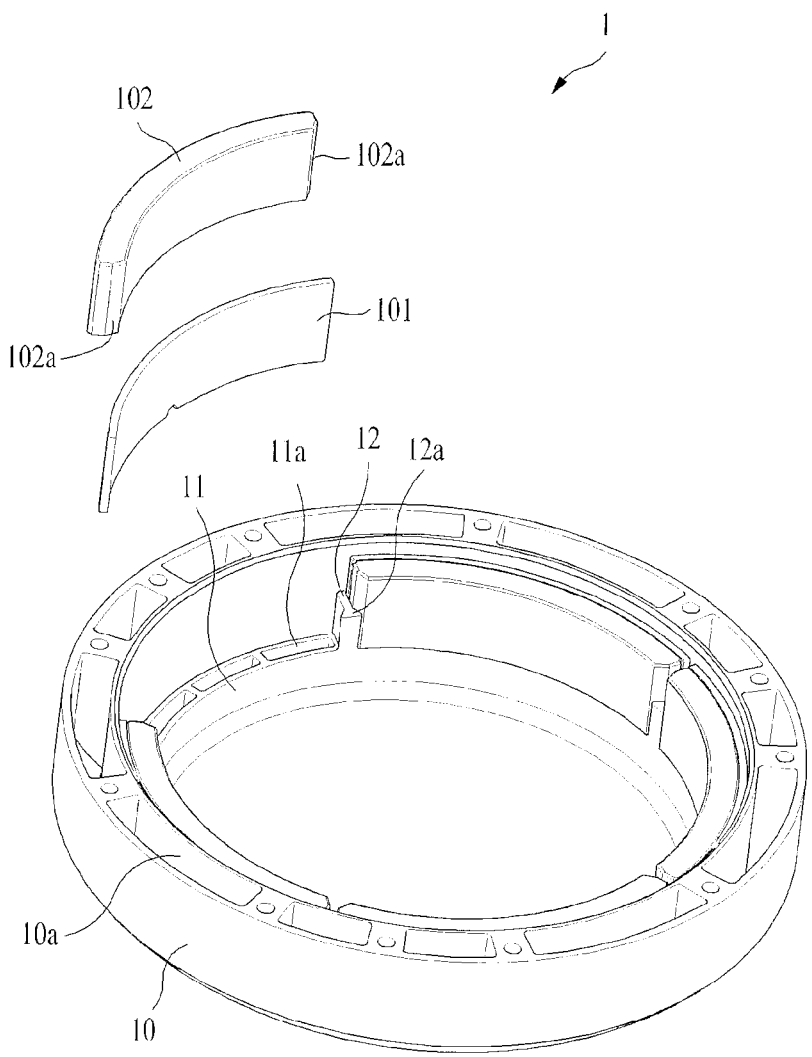

[Fig. 5]
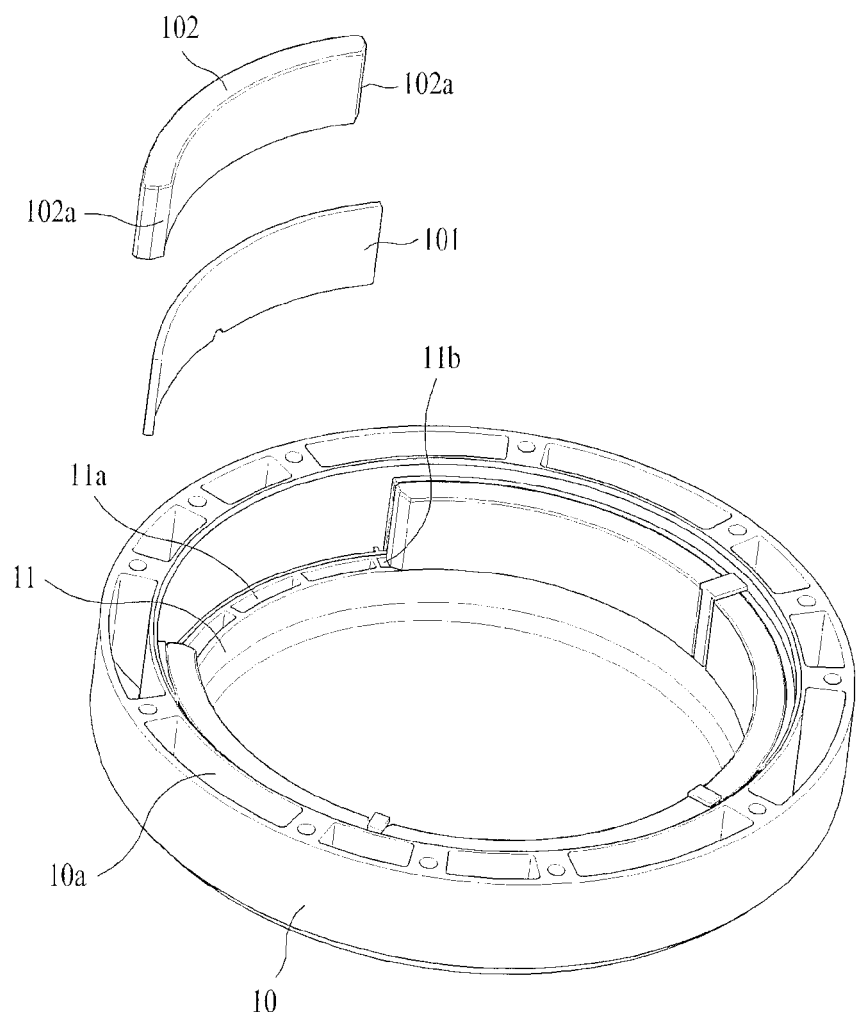

[Fig. 6]
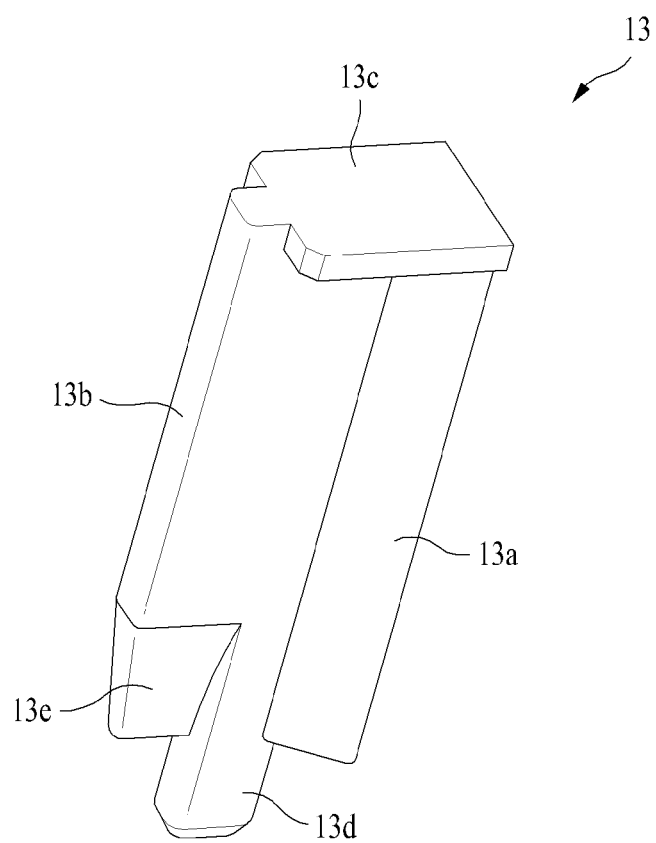

CEILING FAN MOTOR

CROSS REFERENCE TO PRIOR APPLICATIONS

This application is a National Stage Application of PCT International Patent Application No. PCT/KR2015/009253 filed on Sep. 2, 2015, under 35 U.S.C. § 371, which claims priority to Korean Patent Application No. 10-2014-0180032 filed on Dec. 15, 2014, which are all hereby incorporated by reference in their entirety.

TECHNICAL FIELD

The present invention relates to a ceiling fan motor, and more particularly to a ceiling fan motor with a structure supporting the motor more stably and facilitating the manufacture of rotors.

BACKGROUND ART

In general, a ceiling fan motor is an electric equipment installed on an indoor ceiling to rotate fans for air circulation. The ceiling fan motor may be manufactured in structures of various forms. In general, it includes a fixed stator assembly and a rotating rotor assembly installed with blades of the fan.

The ceiling fan motor rotates suspended from the ceiling, and thus it should have a structure that can bear the load of the motor and ceiling fan itself. The conventional ceiling fan motor is disclosed in US Patent Publication No. 2008/0203837.

As for the ceiling fan motor disclosed in the above published patent, the patent does not mention a structure for bearing the load of the ceiling fan motor stably, but only discloses a structure of installing an annular base with engage studs in the inner side of the holder (housing) of the rotor, so that the magnet may be positioned easily and fixed in position by engage studs without having to fix the position by clamps until the glue is dried up when applying glue to the magnet. However, the ceiling fan motor disclosed in the patent still applies glue to the magnet, and thus there is difficulty in manufacturing time and work. Also, the housing (holder) of the rotor plays the role of a yoke where the magnet is attached, and this leads the entire holder to be made of a magnetic substance. Thus, there is a disadvantage that the manufacturing cost is high.

In this regard, the present inventors suggest a ceiling fan motor that may solve the above problems and support the motor more firmly.

DISCLOSURE OF INVENTION

Technical Problem

It is a purpose of the present invention to provide a ceiling fan motor with a structure that may support the load of the motor more stably when rotating being installed on the ceiling.

It is another purpose of the present invention to provide a ceiling fan motor that may facilitate the manufacture of the rotor housing.

It is yet another purpose of the present invention to provide a ceiling fan motor that may lower the manufacturing cost for not having to manufacture the entire rotor housing with a magnetic substance.

The above purposes of the present invention and other purposes implied therein may be easily achieved by the present invention explained in the following.

Solution to Problem

The ceiling fan motor according to the present invention includes a rotor assembly including a rotor housing installed with a plurality of yoke pieces and a plurality of magnets in the inner side, the rotor housing having a plurality of magnet fixing parts formed between the plurality of magnets, a stator assembly placed in the inner side of the rotor assembly, the stator assembly including a stator core, and an upper insulator and a lower insulator engaged with the upper part and lower part of the stator core, and a shaft fixed being engaged with the center part of the stator core, and the magnet is engaged being forcibly press-fitted between the fixing parts.

The ceiling fan motor includes a rotor assembly including a rotor housing installed with a plurality of yoke pieces and a plurality of magnets in the inner side, a stator assembly placed in the inner side of the rotor assembly, the stator assembly including a stator core, and an upper insulator and a lower insulator engaged with the upper part and lower part of the stator core, a shaft fixed being engaged with the center part of the stator core, and a magnet fixing member fixing the magnet, the magnet fixing member being placed between the magnets, and the magnet fixing member is engaged being forcibly press-fitted between the magnets.

In the present invention, the ceiling fan motor may further include an upper cover engaged with the upper part of the rotor housing.

In the present invention, the ceiling fan motor may further include a motor bracket engaged with the upper part of the upper cover.

In the present invention, a cylindrical bearing receiving part may be formed in the center part of the motor bracket, and a first bearing and a second bearing for supporting the rotation of the shaft may be engaged in the bearing receiving part.

In the present invention, the ceiling fan motor may further include a cylindrical bearing stopper installed between the first bearing and the second bearing.

Advantageous Effects of Invention

The present invention has an effect of providing a ceiling fan motor that may support the load of a motor more stably, facilitate the manufacture of the rotor housing, and lower manufacturing cost, when rotating being installed on the ceiling through a new structure.

BRIEF DESCRIPTION OF DRAWINGS

FIG. 1 is a perspective view illustrating the ceiling fan motor according to the present invention;

FIG. 2 is a perspective view illustrating a cross section of the ceiling fan motor according to the present invention;

FIG. 3 is an exploded perspective view illustrating the ceiling fan motor according to the present invention;

FIG. 4 is an exploded perspective view illustrating part of the rotor assembly of the ceiling fan motor according to the present invention;

FIG. 5 is an exploded perspective view illustrating another part of the rotor assembly of the ceiling fan motor according to the present invention; and FIG. 6 is a perspective view illustrating a magnet fixing member of the ceiling fan motor according to the present invention.

Hereinafter, the present invention will be explained in more detail with reference to the accompanying drawings.

MODE FOR THE INVENTION

FIG. 1 is a perspective view illustrating the ceiling fan motor according to the present invention, FIG. 2 is a perspective view illustrating a cross section of the ceiling fan motor according to the present invention, and FIG. 3 is an exploded perspective view illustrating the ceiling fan motor according to the present invention.

As illustrated in FIGS. 1 to 3, the ceiling fan motor according to the present invention includes a rotor assembly 1, an upper cover 2, a stator assembly 3, a motor bracket 4 and a blade 5.

The rotor assembly 1 includes a rotor housing 10. The rotor housing 10 has the shape of a cup where the upper part is open and the lower part is closed. Preferably, it is made of a plastic resin material and manufactured by injection molding. Thus, it may be helpful in lightening the motor. Further, a slimming space 10a and 11a, which is an empty space, is formed perpendicular to the inner side of the rotor housing 10, thereby reducing the amount of resin used and lightening the motor.

A plurality of yoke pieces 101 are placed in the inner wall surface of the rotor housing 10. A plurality of magnets 102 are placed in the inner side of the yoke piece 101. The yoke piece 101 and magnet 102 are fixed by being forcibly press-fitted without using glue, etc. Hereinafter, details in this regard will be explained again with reference to FIGS. 4 and 5.

The upper cover 2 is engaged to cover the upper part of the rotor housing 10, and the stator assembly 3 is placed in an inner space between the rotor housing 10 and the upper cover 2. As illustrated in FIG. 1 or 3, the upper cover 2 and the rotor housing 10 may be engaged by locking bolts, etc. in holes formed along their surroundings, but the engagement method is not limited thereto, and various engagement methods may be applied. A hole where a shaft 35 passes through is formed in the center of the upper cover 2. A motor bracket 4 is engaged in the upper part of the upper cover 2.

The stator assembly 3 includes a stator core 31, an upper insulator 32, a lower insulator 33 and a printing circuit substrate 34. The stator core 31 has a plurality of teeth radially formed on its outer side, and an engagement hole 31a engaged with the shaft 35 is formed in the inner center. A plurality of dummy holes 31b are formed around the hole engaged with the shaft 35. Here, the dummy hole 31b plays the role of reducing the amount of the material of the stator core. Preferably, it is formed to have a symmetrical location. An upper insulator 32 and a lower insulator 33 are engaged to cover the teeth in the upper part and lower part of the stator core 31. A coil (not shown) is wound around the teeth. A printing circuit substrate 34 is placed on the upper part of the upper insulator 32, and various elements 34a are installed on the printing circuit substrate 34. The coil wound around the teeth of the stator core 31 is electrically connected with the printing circuit substrate 34, and the printing circuit substrate 34 is connected with an outer power source through wires (not shown) passing through a center space of the shaft 35.

The shaft 35 has a hollow structure where the center is empty, and it is engaged being fixed to an engagement hole 31a formed in the center of the stator core 31. The upper part of the shaft 35 extends passing through the upper cover 2 to be installed on the indoor ceiling. The lower part of the shaft 35 is engaged with the engagement hole 31a of the stator core 31. Here, a first bearing 36 and a second bearing 37 are engaged at the upper part of the part engaged with the engagement hole 31a, and a bearing stopper 38 having a cylindrical shape is placed between the first and second bearings 36 and 37. When a shaft 35 is installed on the ceiling through this structure, the load received while the entire ceiling fan motor rotates may be supported more stably.

A motor bracket 4 is installed on the bracket mounting part 21 formed on the upper part of the upper cover 2, and the motor bracket 4 radially has the same number of frame parts 41 as the blades 5. The frame part 41 allows the blade 5 to be stably supported by being engaged with the motor bracket 4. A first bearing 36, second bearing 37, and bearing stopper 38 are engaged being press-fitted in the bearing receiving part 42 formed in a cylindrical shape in the center part of the motor bracket 4. A plurality of holes formed in the end part of each frame part 41 of the motor bracket 4 are located at corresponding locations of the holes formed around the upper cover 2 and rotor housing 10, and the motor bracket 4, upper cover 2 and rotor housing 10 may be engaged by locking bolts, etc. in these holes.

Blades 5 forming the ceiling fan are respectively engaged with the outer circumferential part of the motor bracket 4, and a blade holder 51 is engaged together with the motor bracket 4 at the engaging part of the blade 5. FIG. 1 illustrates three blades 5 and a blade holder 51, but the number of blades is not limited thereto, and depending on the specification of the ceiling fan required, the number of blades may be two, four, or more.

FIG. 4 is an exploded perspective view illustrating part of the rotor assembly of the ceiling fan motor according to the present invention.

Referring to FIG. 4, the rotor assembly 1 of the present invention includes a plurality of yoke pieces 101 and corresponding numbers of magnets 102 in the inner side of the rotor housing 10. Of course, the number of yoke pieces 101 and number of magnets 102 may be different, and a plurality of poles may be magnetized and used in one magnet 102. The yoke piece 101 and magnet 102 are placed on a magnet mounting part 11 in the shape of a step formed around the lower part of the inner side of the rotor housing 10, and are engaged being forcibly press-fitted into the inner wall of the rotor housing 10 without using glue. To this end, a magnet fixing part 12 is formed in the inner side of the rotor housing 10 between two adjacent magnets. The magnet fixing part 12 has an inclined surface 12a extending to the left and right in the shaft 35 direction. The inclined surface 12a has a location and shape corresponding to the inclined part 102a formed at both ends of the magnet 102. That is, the inclined part 102a at both ends of the magnet 102 is insertedly fit into the inclined surface 12a of the magnet fixing part 12, thereby allowing the magnet 102 and yoke piece 101 to be engaged being fixed in the inner side of the rotor housing 10. The magnet fixing part 12 is integrally formed when manufacturing the rotor housing 10 by injection molding. The height of the magnet fitting part 12 does not have a particular limitation, but preferably, it is smaller than the height of the magnet 102 to facilitate insertion of the yoke piece 101 and magnet 102.

FIG. 5 is an exploded perspective view illustrating another part of the rotor assembly 1 of the ceiling fan motor according to the present invention, and FIG. 6 is a perspective view illustrating a magnet fixing member 13.

As illustrated in FIGS. 5 and 6, an embodiment applying a magnet fixing member 13 as a separate member between two adjacent magnets 102 in the rotor assembly 1 of the present invention may be applied to the present invention.

That is, the magnet fixing part 12 illustrated in FIG. 4 is not manufactured integrally with the rotor housing 10 by injection molding, and a magnet fixing member 13 engaged separately may be used. To this end, a fixing groove 11b is formed between two adjacent magnets on the magnet mounting part 11 formed around the lower part of the inner wall of the rotor housing 10. Also, the magnet fixing member 13 may be engaged at the location of the fixing groove 11b by forcibly press-fitting the magnetic fixing member 13 between the two adjacent magnets 102, so that the yoke piece 101 and magnet 102 may be engaged in the inner side of the rotor housing 10 without using glue.

An inclined surface 13a corresponding to the shape of an inclined part 102a of the magnet 102 is formed extending to both sides in the shaft 35 direction of the magnet fixing member 13, so as to prevent the magnet 102 from moving in the shaft 35 direction while being forcibly press-fitted. The insertion part 13b formed in the height direction in the center of the magnet fixing member 13 is placed between two adjacent magnets 102 or between the yoke piece 101 and magnet 102, and may be formed being forcibly press-fitted. Preferably, the height of the magnet fixing member 13 is the same as or slightly higher than the height of the magnet 102. An upper stopper part 13c is formed at the upper part of the magnet fixing member 13 to prevent the magnet 102 or yoke piece 101 from leaving the upper part. A lower fixing pin 13d, which is a part formed protruded to the lower part of the magnet fixing member 13 is engaged being insertedly fit into the fixing groove 11b formed in the inner side of the rotor housing 10. A wedge part 13e with a shape getting thinner towards its end is formed at the end of the lower part of the insertion part 13b. This allows the magnet fixing member 13 to be easily press-fitted between the two magnets 102.

It should be understood that the detailed description of the present invention as described above is by way of example only, and is not intended to limit the scope of the present invention. The scope of the present invention is defined by the foregoing claims, and it is intended that the present invention covers the modifications or variations of the present invention provided they come within the scope of the appended claims and their equivalents.

The invention claimed is:

1. A ceiling fan motor comprising:
   a rotor assembly including a rotor housing installed with a plurality of yoke pieces and a plurality of magnets in the inner side;
   a stator assembly placed in the inner side of the rotor assembly, the stator assembly including a stator core, and an upper insulator and a lower insulator engaged with the upper part and lower part of the stator core;
   a shaft fixed being engaged with the center part of the stator core; and
   a magnet fixing member fixing the plurality of magnets, the magnet fixing member being placed between the plurality of magnets,
   wherein the magnet fixing member comprises:
      an inclined surface extended in the direction of the shaft;
      an insertion part formed in the height direction in the center of the magnet fixing member;
      an upper stopper part formed at the upper part of the magnet fixing member;
      a lower fixing pin protruded to the lower part of the magnet fixing member; and
      a wedge part having a shape getting thinner towards to one end of the wedge part, the other end of the wedge part connected to the insertion part,
   wherein the magnet fixing member is forcibly press-fitted between the plurality of magnets.

2. The ceiling fan motor according to claim 1, further comprising an upper cover engaged with the upper part of the rotor housing.

3. The ceiling fan motor according to claim 2, further comprising a motor bracket engaged with the upper part of the upper cover.

4. The ceiling fan motor according to claim 3, wherein a cylindrical bearing receiving part is formed in the center part of the motor bracket, and a first bearing and a second bearing for supporting the rotation of the shaft are engaged in the bearing receiving part.

5. The ceiling fan motor according to claim 4, further comprising a cylindrical bearing stopper installed between the first bearing and the second bearing.

\* \* \* \* \*